UNITED STATES PATENT OFFICE.

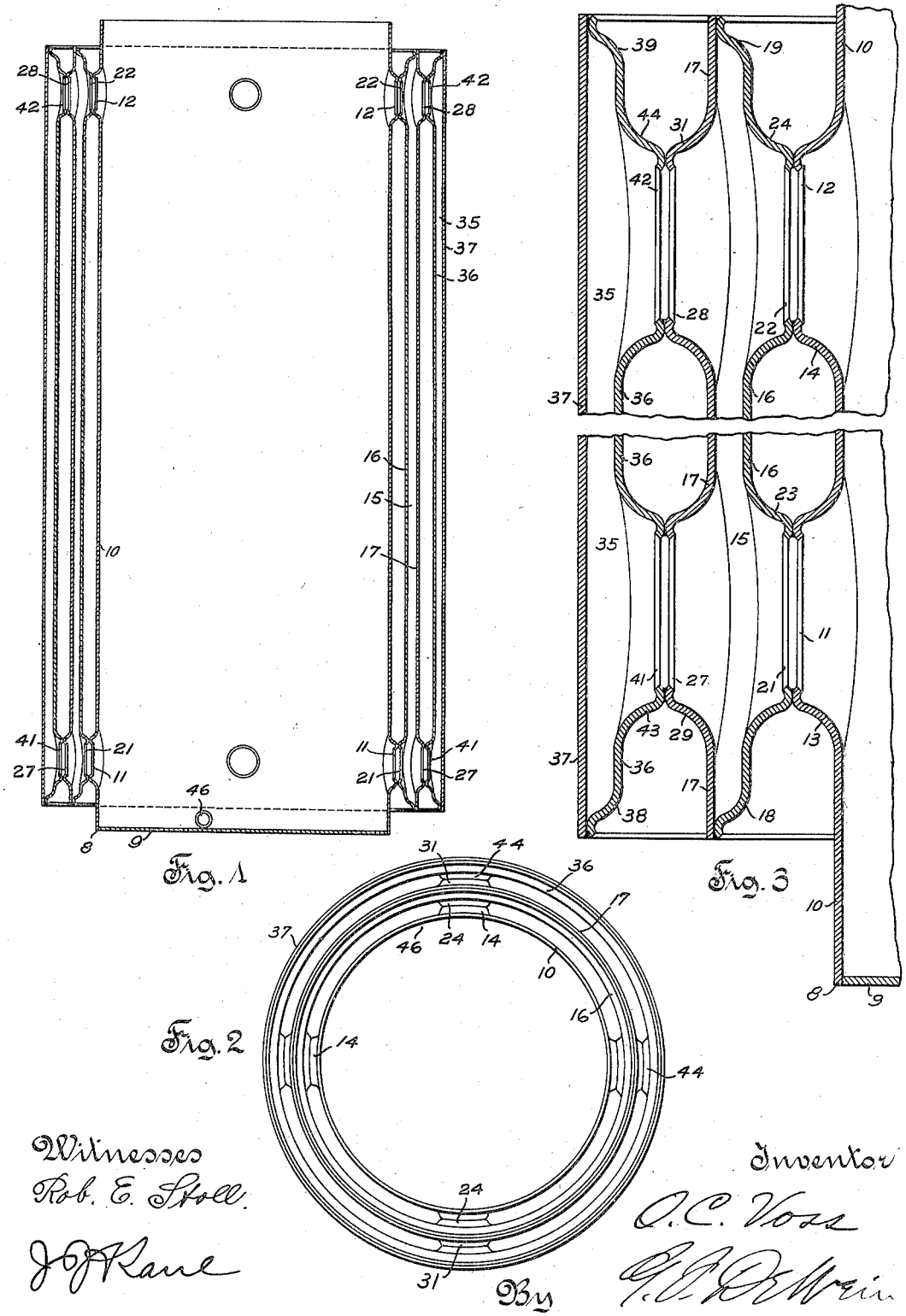

OTTO C. VOSS, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

CASING FOR ELECTRICAL APPARATUS.

1,249,694.  Specification of Letters Patent.  Patented Dec. 11, 1917.

Application filed January 22, 1915. Serial No. 4,070.

*To all whom it may concern:*

Be it known that OTTO C. Voss, a citizen of the United States, residing at West Allis, in the county of Milwaukee and State of Wisconsin, has invented a certain new and useful Improvement in Casings for Electrical Apparatus, of which the following is a specification.

This invention relates in general to receptacles or casings provided with one or more auxiliary chambers such as are of a character suitable for assisting in cooling fluent material that may be contained within the main receptacle, and has particular relation to receptacles or casings of this general nature adapted to inclose electrical apparatus and fluent material in which said apparatus is immersed.

In ordinary practice, it is customary to immerse certain types of electrical apparatus, such as transformers, in a fluid containing receptacle, which serves to maintain the apparatus in a cool operating condition. The efficient operation of the apparatus requires that proper provision be made for the dissipation of heat generated in the cores and windings of the apparatus.

Ordinarily, the fluid, such as oil, in which the apparatus is immersed, has a natural circulation caused by portions of the fluid becoming heated while in immediate contact with parts of the apparatus and rising, cooler fluid from points adjacent the bottom and the outer walls of the receptacle taking the place of the fluid that has become heated. In certain cases, provided the heat to be dissipated is not considerable and a sufficiently large receptacle with a sufficient amount of fluid therein is used, satisfactory operating conditions may be obtained with an ordinary receptacle. However, in order to maintain the size of the receptacle and the quantity of fluid used at a minimum, it is very desirable that artificial means be provided for increasing the heat-radiating surface which serves to extract heat from the heated fluid, and for promoting such circulation of the fluid as brings the same into position wherein the heat may be conducted from the oil in an efficient manner.

In accordance with this invention, one or more external chambers or drums are associated with the main receptacle or casing, being separated therefrom and from each other, and are connected to the main casing and to each other so as to afford communication between the casing and chambers and between the several chambers, where a plurality of the same are used, the connecting means comprising parts integral with the walls of the casing and the chambers.

It is an object of this invention to provide an improved construction comprising a casing suitable for the reception of electrical apparatus immersed in a fluid, and provided with one or more communicating shells or chambers which may serve to maintain the fluid in a cool condition.

These and other objects are attained by this invention, the various novel features of which will appear from the description and drawings disclosing one embodiment of such invention, and will be particularly pointed out in the claims.

In the drawings:

Figure 1 is a vertical section of a casing suitable for the reception of electrical apparatus, and embodying features of this invention.

Fig. 2 is a plan view of the construction shown in Fig. 1.

Fig. 3 is a broken, enlarged section similar to Fig. 1, and showing details of the construction of the casing of Fig. 1.

In the embodiment of the invention disclosed, a casing or receptacle 8, comprising a bottom 9 and side wall 10, and preferably constructed of boiler plate material, has its wall 10 provided with sets of openings 11 and 12 at its lower and upper ends, respectively. These openings may be of any suitable number, in ordinary cases being limited to three or four at each end of the casing. Those portions of the side wall 10 immediately adjacent the openings 11 and 12 are pressed outward, as indicated at 13 and 14, respectively.

An auxiliary annular chamber or drum 15, comprising an inner wall 16 and an outer wall 17, surrounds the main casing 8 and is spaced therefrom. As indicated in the drawings, the end portions of the wall 16 are pressed outward, as indicated at 18 and 19, to contact with the end portions of the wall 17, these end portions being then connected in a fluid-tight manner, as by welding, to form the chamber 15. The wall 16 is provided with openings 21 and 22 in alinement with the openings 11 and 12, respectively, in the casing wall 10, and the material of the wall 16 immediately adjacent the openings 21 and 22 is pressed inward from the general plane of the wall and is united, in a fluid-tight manner, as by welding, with the portions 13 and 14, respectively, of the wall 10, thus providing fluid-tight communicating passageways between the casing 8 and the chamber 15. The outer wall 17 of the shell 15 is provided with openings 27 and 28 in alinement with the openings 11 and 12, respectively, of the wall 10, and the material of this wall 17 immediately adjacent the openings 27 and 28 is pressed outwardly, as indicated at 29 and 31, respectively.

A second annular chamber or drum 35 comprising inner and outer walls 36 and 37, respectively, surrounds the drum 15, and is spaced therefrom, end portions 38 and 39 of the wall 36 being pressed out and connected to end portions of the wall 37 in a fluid-tight manner, as by welding, to form the chamber. The inner wall 36 is provided with openings 41 and 42 in alinement with the openings 11 and 12, respectively, and 27 and 28, respectively, and the material of the wall immediately adjacent these openings is pressed outwardly from the general plane of the wall, as indicated at 43 and 44, respectively, these portions being connected in a fluid-tight manner, as by welding, to the portions 29 and 31, respectively, of the wall 17, to provide fluid-tight communicating passageways between the chambers 15 and 35. The wall 37 forming the outer wall of the complete casing structure is in the form of a plain cylinder.

While the receptacle or casing has been described as being provided with a plurality of shells or drums 15 and 35, nevertheless, as will be obvious, a single shell, or shells greater in number than three, may be provided. In case a single shell is provided, a plain cylindrical wall, similar to 37, but of the same diameter as the wall 17, is substituted for the latter wall; and in case a greater number of shells than two are provided, additional wall portions similar to 17 and 36 and forming one or more additional chambers, are disposed outside the wall 36 and connected thereto, a plain cylindrical wall being used as the outer wall of the complete structure.

An opening 46 may be provided adjacent the lower end of the wall 10 which opening may serve as a drain opening for oil or other fluid contained in the casing.

In accordance with the applicant's improved method of assembling the parts of the above described casing construction, the portions 13 and 14 are first pressed outwardly from the general body of the wall 10 of the casing 8, and the portions 23 and 24 are pressed inwardly from the general body of the wall 16, so that these latter portions may be in substantial engagement with the portions 13 and 14 of the wall 10, when the wall 16 is slipped into place outside of the receptacle 8. The end portions 18 and 19 of the wall 16 being pressed outwardly from the general body of the wall 16 to a distance equal to the desired width of the chamber 15, the wall 16 is positioned outside the casing 8 with the openings 21 and 22 in alinement with the openings 11 and 12, respectively, and the portions 23 and 24 are connected to the portions 13 and 14, respectively, in a fluid-tight manner, as by welding, these connections serving to hold the wall 16 in place relatively to the casing 10. The portions 29 and 31 are pressed outwardly from the general body of the wall 17 and the portions 43 and 44 are pressed inwardly from the general body of the wall 36, and the end portions 38 and 39 of the wall 36 are pressed outwardly from the general body of the wall 36 to a distance equal to the required width of the chamber 35. The walls 17 and 36 being properly positioned, the portions 43 and 44 are connected in a fluid-tight manner, as by welding, to the portions 29 and 31, respectively. The connected walls 17 and 36 are then positioned outside of the wall 16 and the end portions 18 and 19 of the wall 16 are connected in a fluid-tight manner, as by welding, to the end portions of the wall 17. The outer wall 37 is then positioned outside of the wall 36 and the end portions thereof are connected to the end portions 38 and 39 of the wall 36 in a fluid-tight manner, as by welding.

In case an additional cooling shell is to be provided, two cylindrical walls, similar to 17 and 36 and of the proper diameter, are secured together in a manner similar to the walls 17 and 36, and the inner one is then connected to the end portions 38 and 39 of the wall 36. A plain cylindrical member similar to 37 is used as the outer element of the complete structure. In case but one chamber or shell is to be used, a plain cylindrical wall is connected to the end portions 18 and 19 of the wall 16, forming therewith a single shell.

While, in the construction described, the chambers are each made up of two cylindrical elements connected at their end portions, the end portion of the inner element being pressed outward into engagement with the outer one, it will be apparent that the end portion of the outer element may be pressed inward to engage with the undistorted end portions of the inner one, or the end portions of both elements may be distorted to some extent.

In accordance with applicant's invention, a casing construction is provided comprising one or more cooling chambers, each of which is made up of two concentric elements secured together in a fluid-tight manner at their ends, as by welding or autogenously uniting the same, and the inner one is connected to the main casing through autogenous union therewith and in such a manner as to be mechanically supported by the main casing and to afford communication therewith at points adjacent the upper and lower ends, and outer chambers are connected to and supported by inner chambers in a similar manner. It will also be apparent that the parts comprising the complete casing construction can be readily secured together and to the casing, and that the means for supporting the shells relatively to the casing and to each other and for affording communication between the casings and the shell and between the several casings are so disposed as to be wholly within the ends of the completely assembled casing and to present no parts that are liable to be damaged in the ordinary handling of the finished article. Furthermore, in a construction embodying applicant's invention, with the cooling shells spaced an appreciable distance from the main casing and from each other, it will be apparent that practically any desired cooling effect may be attained without increasing the length or depth of the main casing and with little increase in the floor space occupied by the completely assembled apparatus.

It should be understood that it is not desired to be limited to the exact details of construction shown and described, for obvious modifications will occur to a person skilled in the art.

It is claimed and desired to secure by Letters Patent:

1. A casing for electrical apparatus comprising a receptacle-forming body portion, and a plurality of chambers supported in position outside of said body portion and spaced therefrom and also spaced from each other, supporting means for the inner chamber comprising distorted apertured portions of said body portion and the inner wall of said inner chamber, the apertures of said distorted portions being axially alined and said distorted portions being united by a continuous autogenous weld, and the supporting means for said outer chamber comprising a plurality of distorted apertured portions of the outer wall of said inner chamber and the inner wall of said outer chamber, the apertures of said distorted portions being axially alined and said distorted portions united by a continuous autogenous weld, and said supporting means for both said inner and outer chambers being in substantially axial alinement with each other.

2. A casing for electrical apparatus comprising a receptacle-forming body portion, and a plurality of annular chambers or shells disposed outside of and spaced from each other and said body portion, said inner chamber having fluid communication with and being supported by said body portion at spaced points through means integral with said body portion and said chamber and autogenously united and disposed wholly within the end portions of said chamber, and said outer chamber having fluid communication with and being supported by said inner chamber at spaced points through means integral with said chambers and autogenously united and disposed wholly within the end portions of said chambers.

3. A casing for electrical apparatus comprising a receptacle-forming body portion, and a shell or chamber surrounding said body portion and spaced therefrom, said chamber comprising two concentric walls, the inner one of said walls having its end portions flared outwardly and joined to the corresponding end portions of the outer one of said walls by continuous autogenous welds along surfaces substantially parallel to the adjacent part of said body portion, and said body portion and the inner wall of said chamber having a plurality of spaced and axially alined openings adjacent the ends thereof, the material of said body portion and said inner wall about said openings being distorted toward each other and into abutting engagement and united at said abutting portions by continuous autogenous welds.

4. A casing for electrical apparatus comprising a receptacle-forming body portion provided with an externally disposed chamber or shell spaced from said body portion, said chamber being supported in position and fluid communication between said body portion and said chamber being afforded by means comprising spaced portions of said body portion and the inner wall of said chamber distorted toward each other and provided with axially alined apertures, said distorted portions being in abutting engagement along surfaces parallel to the main part of the inner wall of said chamber and united by continuous autogenous welds.

5. A casing for electrical apparatus comprising a receptacle-forming body portion, a chamber or shell surrounding said body portion and spaced therefrom to form a ventilating passageway between said body portion and said chamber, said body portion and the inner wall of said chamber being provided with sets of spaced and axially alined apertures spaced from the ends of said chamber, the material of said body portion and said inner wall immediately surrounding said alined apertures being distorted into engagement and united along said engaging portions by the fusion of metal of the parts to form liquid tight tubular connections between said body portion and said chamber, and said connections forming a means for supporting said chamber in position relative to said body portion.

6. A casing for electrical apparatus comprising a receptacle-forming body portion, and an annular shell or chamber located externally of and spaced from said body portion, said chamber comprising two spaced walls directly united by continuous autogenous welds at their upper and lower edges, and said body portion and the inner one of said walls being apertured at spaced points adjacent the top and bottom, the apertures in said body portion being in alinement with those in said inner wall, and the material about each set of the alined apertures being distorted and united by a continuous autogenous union to form communicating passages between said body portion and said shell, said united distorted portions acting to hold said shell spaced from said body portion and to support said shell in operative position.

7. A casing for electrical apparatus comprising a receptacle-forming body portion, and an annular shell or chamber located externally of and spaced from said body portion, said body portion and the inner wall of said shell being apertured at spaced points adjacent the top and bottom, the apertures in said body portion being in alinement with those in said inner wall, and the material about each set of the alined apertures being distorted and integrally united by fusion of the metal thereof to form communicating passages between said body portion and said shell, said united distorted portions acting to hold said shell spaced from said body portion and to support said shell in operative position.

8. A casing for electrical apparatus comprising a receptacle-forming body portion, and a shell or chamber surrounding and spaced from said body portion, said body portion and the inner wall of said shell being apertured at points adjacent the upper and lower ends, the apertures in said body portion being in alinement with those in said inner wall and the material about each set of alined apertures being distorted and integrally united by fusion of the metal thereof to form communicating passages between said body portion and said shell, said united distorted portions serving as a means for holding said shell spaced from said body portion and for supporting said shell in operative position.

9. A casing for electrical apparatus comprising a receptacle-forming body portion, and a shell or chamber located externally of and spaced from said body portion, said body portion and the wall of said shell being apertured at points adjacent the upper and lower ends thereof, the apertures in said body portion being in alinement with those in said wall and the material about each set of alined apertures being distorted and integrally united by fusion of the metal thereof to form communicating passages between said body portion and said shell, said united distorted portions acting as a means for holding said shell spaced from said body portion and for supporting said shell in operative position.

In testimony whereof, the signature of the inventor is affixed hereto in the presence of two witnesses.

OTTO C. VOSS.

Witnesses:
J. J. KANE,
W. H. LIEBER.